United States Patent [19]

Sitkewich

[11] 4,015,477
[45] Apr. 5, 1977

[54] LINEAR DISPLACEMENT TRANSDUCER

[75] Inventor: W. Jorge Sitkewich, Warminster, Pa.

[73] Assignee: Fischer & Porter Co., Warminster, Pa.

[22] Filed: Dec. 22, 1975

[21] Appl. No.: 643,133

[52] U.S. Cl. .................. 73/398 R; 73/141 A; 73/407 R
[51] Int. Cl.² ............................................ G01L 9/16
[58] Field of Search ............ 73/398 R, 406, 141 A, 73/407 R; 336/30

[56] References Cited

UNITED STATES PATENTS 3,371,536   3/1968   Tellerman ................. 73/398 R

*Primary Examiner*—Donald O. Woodiel

[57] ABSTRACT

A displacement transducer capable of accurately measuring small displacements. The transducer includes a magnetostrictive wire exposed to a stationary magnetic field and having an S-shape, one arc forming one section of the wire and the reverse arc the adjacent section. One end of the wire is fixed, whereas the other end is attached to a displaceable element whereby movement of the element changes the radius of curvature of the arcs. An amplifier whose input is connected to one section of the wire and whose output is connected to the other section thereof yields electrical pulses in the output to produce torsional vibration of the two sections, creating a sinusoidal electrical signal which is fed back to the amplifier input, thereby sustaining oscillations therein whose frequency depends on the radius of curvature and is therefore a function of the extent of displacement. Means are provided to linearize the relationship between displacement and frequency.

7 Claims, 7 Drawing Figures

LINEAR DISPLACEMENT TRANSDUCER

BACKGROUND OF INVENTION

This invention relates generally to a differential pressure transmitter of the force-beam type which operates on the open loop principle and includes a displacement transducer having an S-shaped magnetostriction wire, and more particularly to an arrangement which ensures a linear response of the transducer.

A differential pressure transmitter is used to measure various process variables such as flow rate, liquid level and density when these process variables are convertible to a differential pressure signal. One important application of the force-balance principle is in a differential-pressure transmitter. Such transmitters are widely used in industrial process systems to produce an output signal suitable for transmission to a remote station for operating indicator and automatic process control equipment.

In a transmitter of this type, an elongated force bar is pivoted about a transverse axis and an input force derived from a differential pressure capsule and corresponding to the flow rate of the fluid to be measured is applied to the force bear to produce a torque about its fulcrum. Also applied is a rebalance torque which tends to hold the bar motionless.

The rebalance torque is developed by a negative feedback loop that includes a detector to sense any slight change in force bar position due to an unbalance of torques. The detector generates a corresponding feedback signal that is directed to a feedback motor. The motor, in turn, applies to the force bar a force in opposition to the input force. This feedback signal is maintained proportional to the differential pressure being measured and is usable to produce an output signal for transmission to a remote control station or to an indicating or recording device.

In a force-balance instrument of the electrical type, such as that disclosed in U.S. Pat. No. 3,832,618, the feedback system is provided with an electric motor and the output signal is electrical in nature, whereas in the pneumatic type, such as that disclosed in U.S. Pat. No. 3,742,969, the motor is in the form of a pneumatically-actuated bellows and the output signal which is applied to the bellows is fluidic in nature.

In a force-balance transmitter, there is virtually no movement of the force bar over the full-scale range of operation. This virtual absence of movement is highly advantageous, for it effectively eliminates non-linearity and other errors of the type encountered in so-called motion-balance instruments.

A differential-pressure force-balance transmitter of the type disclosed in the above-cited patents acts on a closed-loop principle in that the input force applied to the force bar is balanced by a feedback force applied thereto through a feedback loop.

Also known are electronic differential pressure transmitters of the so-called open-loop type. In one form of an open-loop differential transmitter, the low and high pressure fluid inputs are applied to a pair of process diaphragms which are hydraulically coupled to opposite sides of an electrode diaphragm. The deflection of the electrode diaphragm depends, therefore, on the difference between the low and high input pressures. This deflection is converted into a corresponding change in the capacitance established between the electrode diaphragm and the meter body. The change in capacitance is detected by a capacitance bridge and amplified to generate an output signal which represents differential pressure.

The advantage of an open-loop differential pressure transmitter of the above-described capacitive transducer type over a standard, closed-loop transmitter of the force-balance type is that the former is not only relatively light-weight and less expensive to manufacture, but it is also substantially insensitive to mechanical vibration. On the other hand, the closed loop force-balance type is characterized by high accuracy, a wide zero suppression range and the absence of electrical connections in the meter body.

In the above-identified copending patent application of Kazahaya, Ser. No. 579,712, filed May 21, 1975, now U.S. Pat. No. 3,968,693, the disclosure of which is incorporated herein by reference, there is shown an open-loop differential pressure transmitter which possesses the advantages both of a closed-loop and of an open-loop transmitter without certain drawbacks characteristic of known devices of these types. Moreover, since the Kazahaya transmitter does not include a pneumatic or electric-feedback motor, meter bodies of the type currently used either in a pneumatic or in an electric differential-pressure transmitter may be used for the open-loop force-beam instrument.

In the Kazahaya transmitter, a force beam is pivotally mounted on the housing of the meter body, the lower end of the beam below the fulcrum lying within the body chamber and the upper end of the beam above the fulcrum extending outside of the body. An input force is applied to the lower end of the beam and deflects the beam to an extent that depends on the flow rate or other parameter being measured.

Linked to the upper end of the beam and external to the meter body is a displacement transducer adapted to convert the deflection of the beam to a corresponding electrical signal suitable for transmission. In a preferred embodiment of the Kazahaya transducer, use is made of an S-shaped magnetostriction wire whose radius of curvature is varied as a function of beam displacement. This S-shaped wire functions as an electro-mechanical resonator which is caused to oscillate torsionally at its fundamental frequency. When the transducer is subjected by the beam to a displacement in the axial direction, the frequency of oscillation changes as a function of displacement.

The frequency of oscillation of the transducer is therefore an index of displacement and represents the output signal. It has been found that the relationship between the frequency of the output signal and displacement exhibits non-linear deviations. The non-linearity in this relationship can be larger than 1.0% of the transducer span. This margin of error may be acceptable in some differential-pressure transmitter applications, but it is not tolerable in applications involving automatic industrial process control systems wherein the transmitter acts to sense a process variable to produce a signal for transmission to a process control mechanism.

SUMMARY OF INVENTION

In view of the foregoing, the main object of this invention is to provide a displacement transducer of the magnetostriction type which produces an output signal whose frequency is a function of displacement, the transducer having means to insure a linear relationship between frequency and displacement, whereby the transducer is suitable for use in industrial process control systems.

While the invention will be described in the context of a magnetostriction transducer incorporated in a differential transmitter of the force-beam type, it is to be understood that the linear displacement transducer is useful for many other purposes. Thus in the Tellerman U.S. Pat. No. Re. 26,774, there is disclosed a transducer having an S-shaped magnetostriction wire operating in conjunction with an aneroid capsule to provide altimeter readings, the present invention being applicable thereto.

More particularly, it is an object of this invention to provide a displacement transducer of the S-shape magnetostriction type having means to linearize its response in measuring very small displacements, whereby a 0.1% full span accuracy may be attained in the measurement of displacements in the order of 0.5% of the transducer length.

In one preferred embodiment of the invention, improved linearity is obtained in the operation of an S-shaped magnetostriction type transducer in the measurement of small displacements by means of preloading the transducer in compression or in extension in order to impose a bias thereon at a point corresponding to the inflexion point.

In another preferred embodiment of the invention, the relationship between output frequency and displacement of an S-shaped transducer is linearized over a wide range of input preloading by modifying the transducer geometry so that the two sectors of circumference of the S-shaped wire are smaller than a 180° arc to a degree whereby in the response of the transducer, second order deviation is slight and virtually no third order deviation exists in the output signal.

OUTLINE OF THE DRAWINGS

For a better understanding of the invention as well as other objects and further features thereof, reference is made to the following detailed description to be read in conjunction with the accompanying drawings, wherein:

FIG. 1 illustrates an open-loop force-beam differential-pressure transmitter which incorporates a displacement transducer;

FIG. 2 schematically shows a first embodiment of a displacement transducer;

FIG. 3 schematically shows a second embodiment of a displacement transducer;

DESCRIPTION OF INVENTION

Basic Structure of D-P Transmitter

Figure 1:
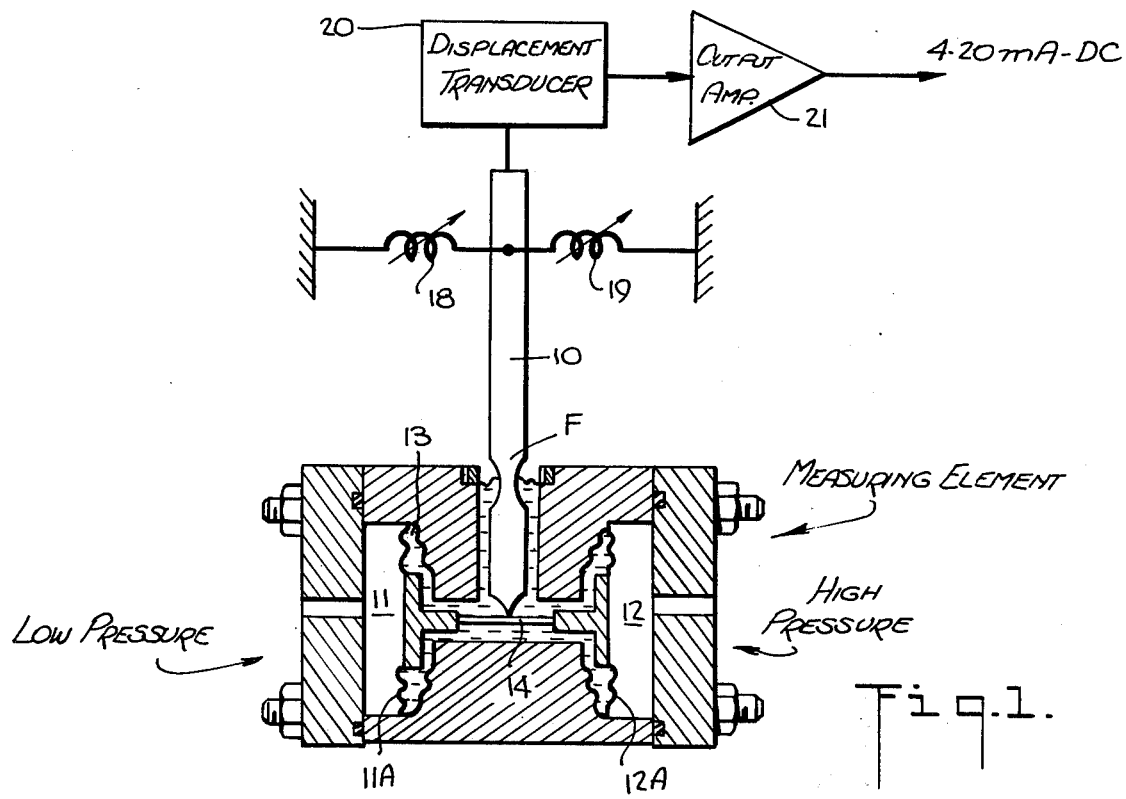

Referring now to FIG. 1, there is schematically illustrated an open-loop force-beam differential-pressure (D-P) transmitter according to the invention. The two major elements of the D-P transmitter are the measuring element that senses the existing differential pressure and converts it into a beam motion, and the displacement transducer that converts the motion of the force-beam into an electrical output signal proportional to the differential being measured.

The measuring element is generally defined as that portion of the instrument which is below the fulcrum F of force-beam 10. This beam is pivotally mounted on the housing of a meter body M. The measuring element includes a differential-pressure capsule provided with a pair of identical pressure chambers 11 and 12, wherein corrugated metal diaphragms 11A and 12A are mounted. The diaphragms form the walls of a meter chamber containing a hydraulic fill 13.

Low and high fluidic pressures are applied to pressure chambers 11 and 12, respectively. In practice, suitable pipes carrying fluid under pressure are coupled to the chambers, the pipes being connected to the upstream and downstream sides of an orifice plate inserted in a process line, whereby the differential pressure between the upstream and downstream pipes is proportional to the square of flow rate through the line.

The D-P transmitter may therefore be mounted directly in the line at a point remote from a central control station to which the measurement data is sent in the form of an electrical signal. At the control station, the received signal may be indicated or recorded, or used to operate process-control apparatus.

In the meter chamber, pressure diaphragms 11A and 12B are joined together by means of a link-rod 14 whose midpoint is connected to the lower extremity of force-beam 10. The beam is pivotally supported in the vertical position by a seal diaphragm 15 and by vertical flexures (not shown). Because of the difference between the low and high pressure fluids applied to pressure-responsive diaphragms 11A and 12B, link 14 tends to shift leftward to an extent depending on this difference, thereby applying a force to the lower extremity of beam 10 and causing deflection of the beam in the clockwise direction to a degree proportional to the differential pressure. The purpose of hydraulic fill 13 is to provide hydraulic damping of noise.

The extent of movement at the upper end of the force-beam is a function of the spring rate of the pressure-sensing diaphragms 11A and 12A and the sealing diaphragm 15, as well as the spring rate of a pair of opposing range springs 18 and 19, each connected between a point on the upper end of the force-beam and a fixed ground or frame point. Zero suppression bias is mechanically provided by the range springs, the tension thereof being adjustable.

The degree of beam deflection is determined by a displacement transducer, generally designated by numeral 20, which produces a proportional electrical signal that is amplified in output amplifier 21 to yield a high-level output signal in the usual process control range (i.e., 4 to 20 mADC).

While in a force-balance transmitter it is generally assumed that the force beam is virtually motionless because the input force applied to the bar is balanced by the corresponding feedback force, in reality one will observe a slight motion of the bar in normal operation. This slight motion is approximately 0.005 inches and is linear with respect to differential pressure applied to the instrument. Such slight motion is required, for the detector responds to the motion to generate the necessary feedback signal.

Should the force bar be used in conjunction with a differential-pressure capsule in an open-loop arrangement, the capsule and the associated force bar would tend to move far beyond the linear region since no feedback force acts to limit force bar displacement. It is for this reason that in an open-loop instrument in accordance with the invention, the force bar movement is severely restrained by range springs 18 and 19. The degree of restraint is such as to limit force bar movement to an extent equivalent to that encountered in a force-balance instrument. Hence despite the absence of a feedback force, as in a closed-loop force-balance transmitter, the open-loop force-beam instrument in accordance with the invention exhibits a high degree of linearity comparable to that of the force-balance transmitter.

But since in this restrained open-loop force-beam arrangement, the response to a differential pressure is in the form of a slight displacement, it is important that the transducer associated with the beam be highly sensitive to the movement thereof.

First Embodiment of Displacement Transducer

Figure 2:
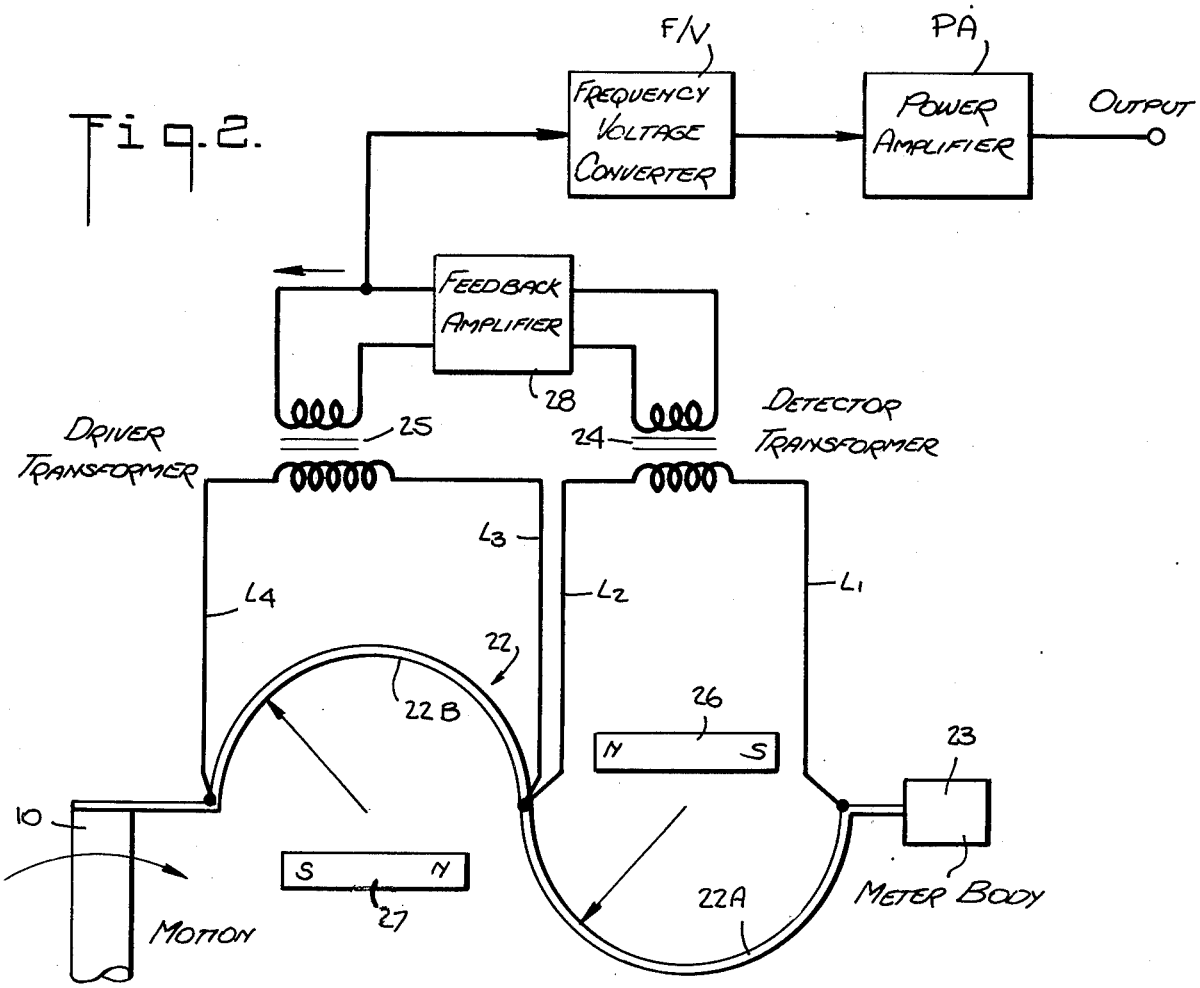

Referring now to FIG. 2, there is shown the magnetostriction-type displacement transducer 20 which includes a wire 22, one end of which is attached to the top end of deflectable force-beam 10, the other end being anchored on a bracket 23 fixed to the meter body. The wire, which is formed of magnetostrictive material, such as 0.02 inch NI-Span C, has an S-curve bend therein, thereby defining an arcuate section 22A and a reverse arcuate section 22B.

Magnetostriction refers to a change in the dimensions of a ferromagnetic substance in response to a magnetic force. The effect appears most strongly in iron, nickel and cobalt, as well as in alloys of these metals. There are many possible physical changes that a magnetostrictive material may undergo. Thus the change may be in linear or circular dimensions, or in volume. Circular changes in a magnetostrictive wire takes the form of a twisting or torsional motion. In the displacement transducer of the magnetostriction type, the primary winding of a detector transformer 24 is connected across section 22A of wire 22 through leads $L_1$ and $L_2$, and the secondary of a driver transformer 25 is connected across section 22B through leads $L_3$ and $L_4$, leads $L_2$ and $L_3$ both being soldered or welded to the junction of the two wire sections (a common lead may be used for leads $L_2$ and $L_3$). Adjacent section 22A is a permanent magnet bar 26, while adjacent section 22B is a like permanent magnet bar 27 so that each section of the wire is exposed to a stationary magnetic field.

When a current pulse is applied through leads $L_3$ and $L_4$ to section 22B, the transversal magnetic field internal to the wire and created by the applied current is superposed on the stationary magnetization of the wire created by the external magnets. This creates a helical magnetic field which by means of the magnetostriction of the wire material produces a torque or twist. This phenomenon is referred to as the Wiedemann effect. This twisting action excites a torsional resonance within the wire covering the sections 22B and 22A thereof. The resulting sinusoidal mechanical motion of wire section 22A induces a voltage signal in wire section 22A because of its internal longitudinal magnetization. This phenomenon is known as the reverse-Wiedemann effect. In practice, this voltage signal attains a level of a few millivolts.

Thus section 22B acts as a torsional motor that is responsive to an incoming electric pulse to produce a mechanical standing wave of torsion that includes section 22A of the wire. Section 22A acts, therefore, as a generator to convert the incoming pulse into a sinusoidal electrical pulse.

The secondary winding of transformer 24 is connected to the input of an electronic amplifier 28 whose output is coupled to the primary winding of transformer 25. When the amplifier is first turned on, its initially high gain amplifies the narrow band noise existing in section 22A of the transducer. As the amplified signal is fed into section 22B of the transducer, the narrow band oscillations grow in amplitude until the amplifier delivers a current pulse to section 22B for each period of sinusoidal signal detected in section 22A.

The fundamental frequency of the oscillations produced by the magnetostriction oscillator including amplifier 28 is determined by the delay time of the wire. The reason NI-Span C is preferred as the wire material is that it affords a stable delay time despite ambient temperature changes. One may also use as the wire material the alloy Elinvar-X (0.016 inch diameter). Transformers 24 and 25 serve only to match the impedances of the wire sections with the amplifier input and out impedances. In practice, the circuit can be designed without such transformers.

The time delay and hence the frequency of the signal generated by the magnetostriction oscillator depend on the radius of curvature of wire sections 22A and 22B. Since one end of wire 22 is attached to the top of force-beam 10 and is caused by the deflection of this beam to move closer to the fixed point established by bracket 23 to which the other end of the wire is attached, thereby changing the radius of curvature, the oscillator frequency is caused to change in proportion to the motion of the beam. In practice, the displaceable element need not be a force-beam but any other element whose movement is to be sensed and accurately measured.

The signal derived from the output of amplifier 28 is applied to a frequency-to-voltage (or current) converter F/V, which produces a voltage (or current) signal proportional to the applied frequency. This signal is amplified by a power amplifier PA to provide an output in the 4 to 20 mA-DC range, which is the range usually employed in process control applications.

Second Embodiment of Displacement Transducer

Figure 3:
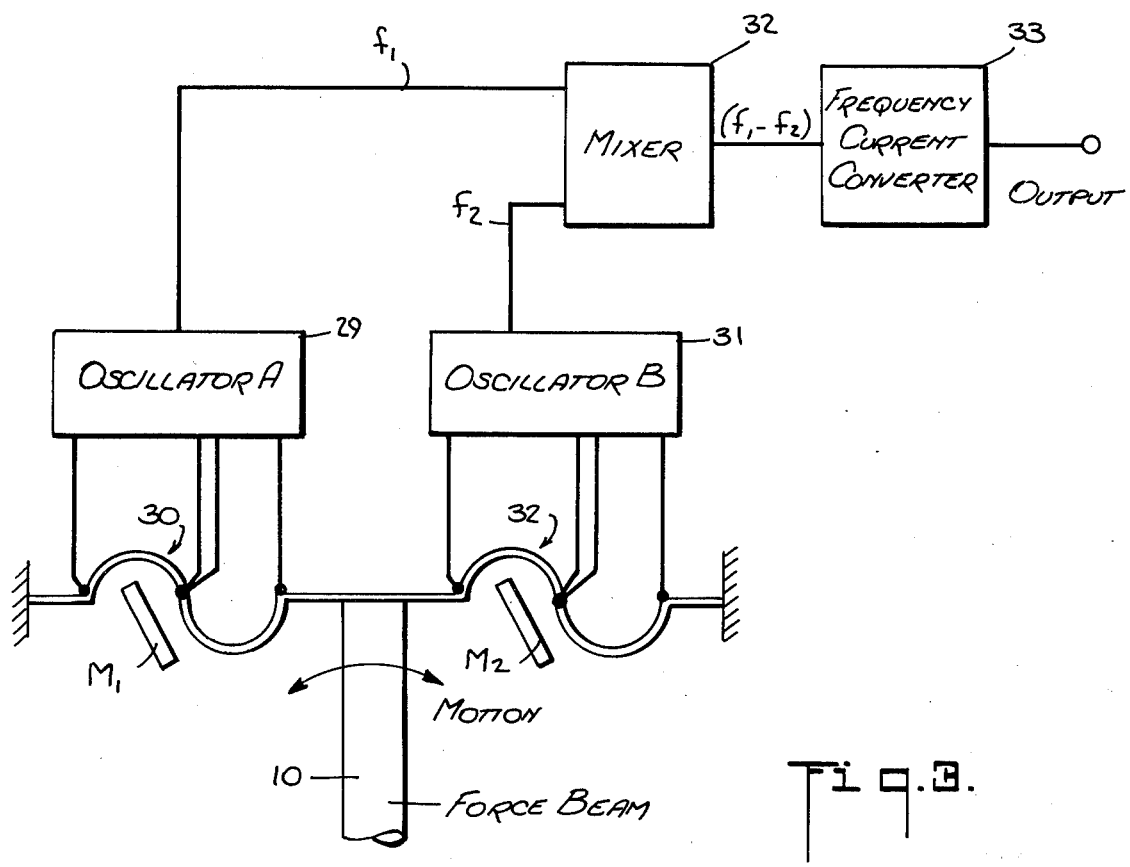

In the dual magnetostriction wire oscillator arrangement shown in FIG. 3, deflectable force-beam 10 is coupled to a pair of magnetostriction oscillators A and B whose S-curved wires 30 and 32 are symmetrically arranged on opposite sides of the beam. Each oscillator is essentially the same as the single oscillator shown in FIG. 2, except that instead of a pair of bar magnets, one for each wire section, each oscillator is provided with a single magnet ($M_1$ and $M_2$) to establish a stationary magnetic field embracing both arcuate sections of the associated S-shaped wire.

Oscillator A is constituted by a feedback amplifier 29, which cooperates with the arcuate sections of the S-shaped magnetostrictive wire 30 to produce an output signal $f_1$ whose frequency is increased by a displacement of the beam in the counterclockwise direction. Oscillator B is constituted by a feedback amplifier 31 which cooperates with the arcuate sections of the identical S-shaped magnetostrictive wire 32 to produce an output signal $f_2$, whose frequency is decreased by a displacement of beam 10 in the counterclockwise direction.

Output signals $f_1$ and $f_2$ generated by the pair of oscillators are applied to a mixer 32 from which is derived a low-frequency difference beat signal $f_3$ ($f_3 = f_1 - f_2$) whose frequency is proportional to the extent of force-beam movement. Signal $f_3$ is then converted in a frequency-to-current converter 33 to the desired 4 to 20 mA-DC output.

Since oscillators A and B operate differentially, the sensitivity of the system is twice as high as that of a single oscillator. The reason for this is that a given beam displacement results in equal and opposite deviations in the operating frequencies of oscillators A and B from a central frequency representing the neutral or zero position of the beam. For example, if the frequency of oscillator A deviates from a center frequency of 118,000 Hz to 118,200 Hz and that of oscillator B simultaneously deviates from 118,000 Hz to 117,800 Hz, the resultant beat frequency is 400 Hz, which is twice the 200 Hz deviation of each oscillator.

Moreover, the effect of temperature on oscillators A and B will be the same, and cause each oscillator to deviate to the same extent from the central frequency; hence this effect will be balanced out in that the output frequency $f_1$ of oscillator A is subtracted from the output frequency $f_2$ of oscillator B in mixer 32. Thus the symmetrical arrangement of oscillators A and B has the advantage of high sensitivity and temperature stability.

Linearization

In the restrained open-loop force beam arrangement of the type illustrated in the foregoing figures, the response of the beam to differential pressure is in the form of a slight displacement. Hence not only must the displacement transducer associated with the beam be highly sensitive, but it also must be capable of providing an output signal whose frequency bears a linear relationship to displacement in order to afford accurate pressure indications or to effect precise control of the process control system responsive to this signal.

For example, with a transducer having an axial length of 1.0 inch. to satisfy this requirement, the transducer must afford 0.1% full span accuracy in the measurement of displacement in the order of 0.005 inch. The linearization means disclosed herein, when applied to S-shaped transducers of the type shown in FIGS. 2 and 3, improves the response characteristics thereof to a degree which renders these transducers highly accurate.

Figure 4:
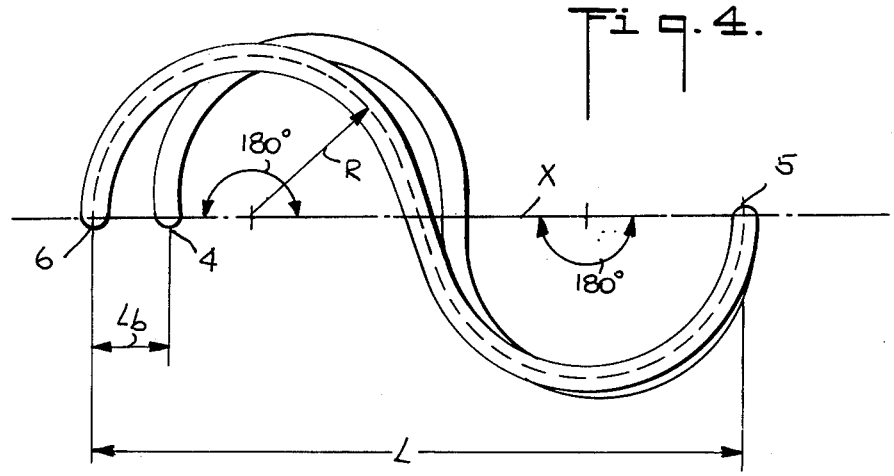
FIG. 4 illustrates the effect of a linearization bias on a transducer of the type shown in FIGS. 2 and 3.

In the transducers illustrated in FIGS. 2 and 3, use is made of an S-shaped magnetostriction wire which, as separately shown in FIG. 4, is composed of two arcuate sections 1A and 1B, each having a 180° arc. One end of the wire is fixed at point 5, whereas the other end is secured at point 6 to a deflectable beam of other displaceable element, this point moving in the axial direction X.

In the absence of a displacement, the axial length of the transducer is the distance L between points 5 and 6. To render the relationship between displacement and output frequency linear, the S-shaped wire is preloaded or biased to an extent represented by distance $L_b$ so that in the absence of a displacement force the wire extends between point 5 and a point 4. It has been found that the optimum bias is 2.0% of the axial length L of the transducers.

This preloading has the effect of shifting the transducer response to a region in its frequency-vs-displacement curve, where the non-linear components are very small. Thus, as shown in curve (a) in FIG. 5, which represents the characteristic curve for an S-shaped wire whose sections are formed by 180° arcs, the arrow in this curve indicates an inflexion point in the curve, the response being substantially linear in this region of the curve.

It will be seen that the upper and lower portions of curve (c) on either side of the point of inflexion are somewhat non-linear. This inflexion point occurs at 0.020 inch. of preload, which is the optimum value for a 1-inch long transducer with 180° arc sections. It has been found that as the preloading is increased from 0.000 inch to 0.034 inch, the non-linearity changes sign, thereby indicating the presence of an inflexion point, as indicated in FIG. 5a.

Figure 6:
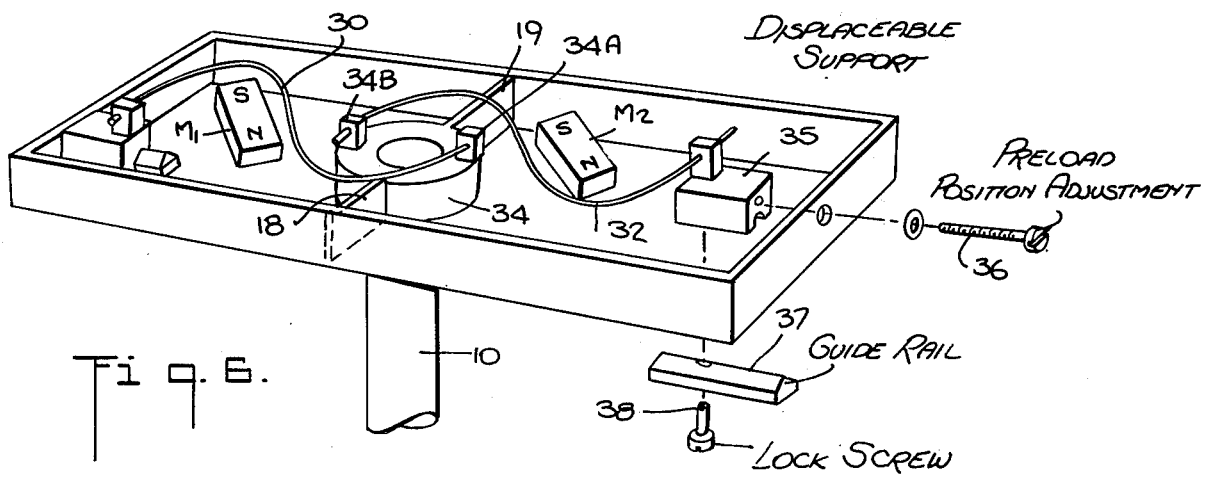
FIG. 6 illustrates the physical structure of the displacement transducer of the type shown in FIG. 2, and including a linearization bias in accordance with the invention.

Referring now to FIG. 6, there is shown the structure of a dual S-wire arrangement of the type shown in FIG. 2, the wires being pre-loaded to effect linearization of this response. The upper end of beam 10 is restrained by flat springs 18 and 19 secured at diametrically-opposed positions to a headpiece 34 attached to the top of the beam. The head-piece is provided with a tab 34A to which one end of S-wire 30 is attached, and a diametrically-opposed tab 34B to which the corresponding end of S-wire 32 is attached.

The other ends of wires 30 and 32, instead of being anchored to a fixed point as in FIG. 2, are each attached to an adjustable fixture, only one of which is illustrated, to permit the imposition of a bias on the wire to effect linearization.

FIG. 6 shows the adjustable fixture for wire 32, and it will be seen that support 35 of the fixture is shiftable by means of a screw 36 on a guide rail 37 to provide the desired degree of bias, the adjusted position of the support being set by a lock screw 38.

It is the property of constant non-linearity over a wide range of applied displacements which renders advantageous the use of a dual system of S-shaped transducers, as shown in FIG. 6, mounted differentially, for this arrangement makes possible a further linearization of the response down to a 0.1% of full span accuracy.

In a differentially-mounted system, the same beam displacement produces first order frequency changes of opposite sign in both S-shaped transducers as well as second order frequency changes which are of the same sign in both transducers. Consequently, when the outputs of the two transducers are algebraically added in the manner illustrated in FIG. 3, the resultant output will reflect only a linear frequency change, for in the second order changes are cancelled out.

Figure 7:
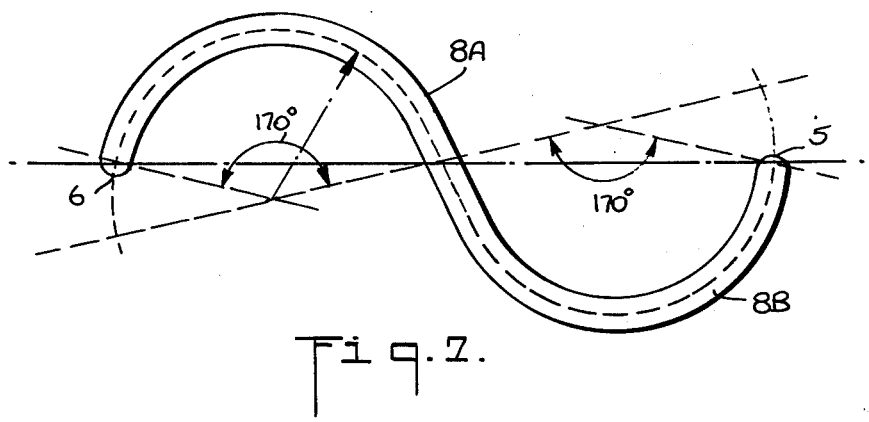
FIG. 7 illustrates the effect of a change in arc on linearization.

FIG. 7 illustrates another approach to effecting linearization. In this instance, the S-shaped transducer formed by arcuate sections 8A and 8B need not be mechanically preloaded. Instead, the configuration of the arcs is such that they are less than 180°, the sections each having a 170° arc.

Figure 5:
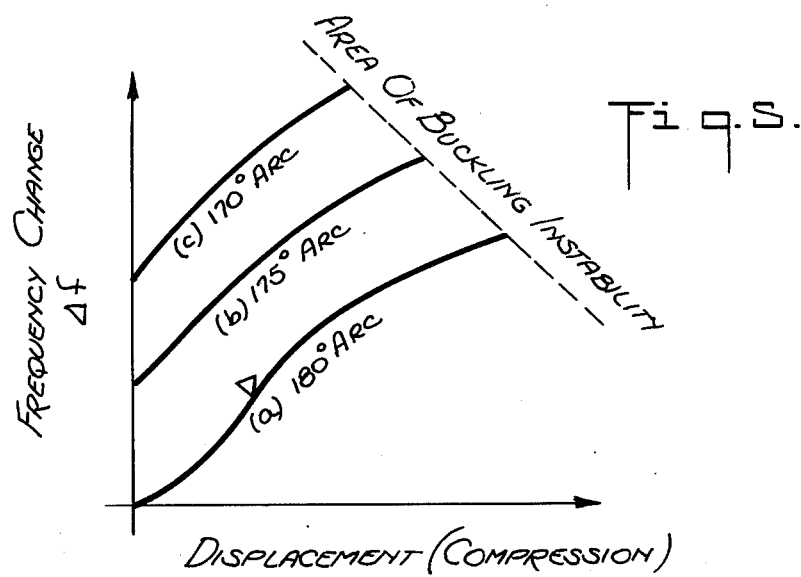
FIG. 5 shows three curves representing the effect of displacement on the frequency of transducers having different degrees of arc.

The fact that a change in geometry of the S-shaped transducer results in an improvement in linearity is evident by comparing response curves (a), (b) and (c) in FIG. 5. In curve (a), which represents the response for a 180° arc, the non-linearity content is relatively high, and in this instance mechanical preloading is required to render the transducer linear.

Curve (b) for a 175° arc is somewhat more linear but it still has an inflexion point, whereas in curve (c) for a 170° arc, the inflexion point tends to disappear, and the curve is almost perfectly linear. It has been found that the non-linearity is decreased from 1.0% to 0.25% full span and that this decrease remains almost constant over a range of preload in the order of 300% full span. The response of the transducer is such that there is very little second order deviation, and virtually no third order deviation in the output signal.

While there have been shown and described preferred embodiments of a linear displacement transducer in accordance with the invention, it will be appreciated that many changes and modifications may be made therein without, however, departing from the essential spirit thereof.

I claim:
1. A displacement transducer capable of accurately measuring a small movement of a displaceable element, said transducer comprising:
   A. an S-shaped wire formed of magnetostrictive material and having two arc sections, one end of the wire being fixed and the other being linked to said element, whereby movement of the element results in a change in the curvature of the arcs;
   B. means subjecting the wire to a stationary magnetic field;
   C. an amplifier whose input is connected to one section of the wire and whose output is connected to the other section thereof, whereby electrical pulses yielded in the amplifier output produce torsional vibration in the two sections to create a sinusoidal electrical signal which is fed back to the input of the amplifier, thereby sustaining oscillations in the amplifier to produce an output signal whose frequency depends on the radius of curvature of the wire sections and is therefore a function of displacement, the relationship between the output signal and displacement exhibiting non-linear deviations; and
   D. means associated with the wire to linearize the relationship between displacement and the frequency of the output signal.

2. A transducer as set forth in claim 1, wherein said linearization means is constituted by means mechanically preloading the wire.

3. A transducer as set forth in claim 2, wherein said arcs are 180°, and said linearization means is constituted by an adjustable fixture holding said one end of said wire to adjust the normal axial distance between said one end and the other end of the wire.

4. A transducers as set forth in claim 1, wherein said means is constituted by a reduction in the arcs of said wire to an extent less than 180°, at which the response characteristic of the transducer is substantially linear.

5. A transducer as set forth in claim 4, wherein said arcs are 170°.

6. A transducer as set forth in claim 1, wherein said displaceable element is the force beam of an open-loop differential-pressure transmitter.

7. A transducer as set forth in claim 6, wherein said beam is coupled to a pair of transducers of the type set forth in claim 1, differentially-arranged whereby a deflection of said beam expands one wire and compresses the other.

* * * * *